Jan. 2, 1968   D. E. THOMAS   3,361,950
DIODE PROTECTOR FOR ALTERNATOR CHARGED STORAGE BATTERIES
Filed Jan. 3, 1966

INVENTOR
D. E. THOMAS
BY R. B. Ardis
ATTORNEY 2,361,950
Patented Jan. 2, 1968

3,361,950
DIODE PROTECTOR FOR ALTERNATOR CHARGED STORAGE BATTERIES
Donald E. Thomas, Madison, N.J., assignor to Bell Telephone Laboratories, Incorporated, New York, N.Y., a corporation of New York
Filed Jan. 3, 1966, Ser. No. 518,464
8 Claims. (Cl. 320—25)

This invention relates generally to electrical protective circuits and more particularly to protective circuits for use with storage batteries which are normally charged from alternator-rectifier systems.

When a storage battery is charged from an alternator, it is necessary to connect a rectifier between the alternator windings and the battery not only to convert the alternating current generated by the alternator to direct current but also to ensure that the charging voltage applied to the battery is of the correct polarity. Modern semiconductor diodes rather than thermionic diodes are generally used as the rectifying elements because they require no external source of heating current, because they require no warm-up time, and because they are quite rugged mechanically. With such diodes used as the rectifying elements, however, it is important that an external charging source or booster battery not be connected to the storage battery with the wrong polarity, for then the full voltage of the charger would be connected directly across the diodes in the forward current direction, burning them out and necessitating replacement. There are a number of known protective circuits for use with battery which are designed to warn against and prevent such a reverse application, but all tend to be relatively complex and, hence, expensive.

An object of the present invention is to protect the rectifier diodes in an alternator-rectifier battery charging circuit in as simple a manner as possible.

Another object of the invention is to provide an alternator-rectifier charging circuit wtih a rectifier diode protective circuit which is inexpensive enough that one can be permanently installed on a large number of storage batteries.

In accordance with the invention, a storage battery having an alternator-rectifier charging circuit is provided with an insulating member designed to deny normal external access to the ungrounded or "hot" battery terminal, an auxiliary terminal, and a unilaterally conducting device or diode connected between the ungrounded or "hot" battery terminal and poled in the direction to charge the battery from an external charger or booster battery connected between the auxiliary terminal and the grounded terminal of the battery. The insulating member prevents application of an external charger or booster battery to the ungrounded terminal of the storage battery while permitting normal access from the alternator-rectifier charging circuit, and the auxiliary terminal provides a substitute terminal to which the external charger can be connected. As long as the external charger is applied with the correct polarity, the added diode conducts normally and, because they are biased in the reverse direction, no current flows through the rectifier diodes. If the external charger is applied with the incorrect polarity, however, the added diode blocks any flow of current and the rectifier diodes are protected.

Other objects and features of the invention will become apparent from a study of the following detailed description of a specific embodiment.

In the drawing:

FIG. 3 is a cross-section view of the terminal arrangement shown in FIG. 2.

Figure 1:
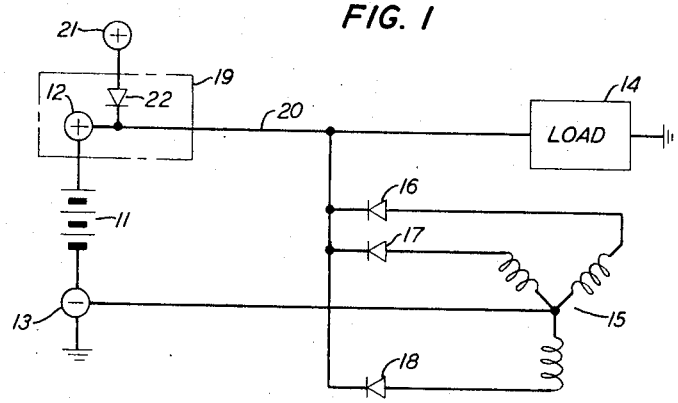
FIG. 1 is a schematic diagram of a storage battery charging circuit embodying the invention.

In the embodiment of the invention illustrated in FIG. 1, a storage battery 11 has a positive terminal 12 and a negative terminal 13. Battery 11 may, by way of example, be of the type used to power telephone equipment during power emergencies or, alternatively, of the smaller type used to power the electrical equipment in motor vehicles. As illustrated, positive terminal 12 is the so-called "hot" lead and negative terminal lead is grounded. It is to be understood, of course, that negative terminal 13 may be the "hot" lead and the positive terminal grounded, in which case all diode polarities need to be the reverse of those shown.

As shown in FIG. 1, storage battery 11 is supplying power to a load 14, which is connected between positive battery terminal 12 and ground. A three-phase alternator 15 is shown having its three field windings connected in a so-called Y configuration and a rectifier made up of three silicon diodes 16, 17, and 18 connected between the field windings and storage battery 11. As illustrated, each silicon diode is connected between a respective field winding and positive battery terminal 12 and poled for easy current flow toward terminal 12. The common point in the Y configuration of the three field windings is grounded.

The storage battery charging circuit which has been described thus far is conventional. Single-phase or two-phase alternators may, of course, be employed as alternatives to three-phase alternator 15. Battery 11 supplies power to load 14 and is charged from alternator 15 and the rectifier made up of silicon diodes 16, 17, and 18. Diodes 16, 17, and 18 are poled so that the charging potential applied to battery 11 is positive at positive terminal 12 and negative at negative terminal 13. As discussed above, a problem arises when storage battery 11 becomes discharged and it is necessary to charge it from an external charger or booster battery. As long as the external charger is applied with the proper polarity, i.e., positive to positive and negative to negative, all is well. Current from the external charger or booster battery cannot flow through silicon diodes 16, 17, and 18 in the reverse direction, and they are protected. Should the external charger be applied with the incorrect polarity, i.e., positive to negative and negative to positive, no such protection would exist. Current would then flow through diodes 16, 17, and 18 in the forward direction, burning them out and necessitating their replacement.

The present invention solves this problem in a simple and inexpensive manner. It does so, moreover, in a manner which permits battery 11 to be charged without hazard to diodes 16, 17, and 18 from any conveniently available source of charging current. It does not, in other words, require any complex mechanism in an external charger but, rather, provides a simple attachment which can be left permanently installed on the storage battery itself.

In accordance with the invention, external access to positive battery terminal 12 from a charging source is denied by an insulating member 19. Internal access from load 14 and the alternator-rectifier combination is provided by an insulated lead 20. An auxiliary terminal 21 is provided for charging purposes, and a protective diode 22 is connected between auxiliary terminal 21 and the now concealed positive battery terminal 12. As illustrated, diode 22 is poled for easy current flow from auxiliary terminal 21 toward positive battery terminal 12. Diode 22 may be either a silicon or a germanium diode of suitable current carrying capacity. A germanium diode has a lower forward voltage drop under full load, but a silicon diode is more suitable if high temperature conditions are likely to be encountered.

The added circuitry provided by the invention protects rectifier diodes 16, 17, and 18 under all conditions of operation. Since insulating member 19 denies external access to positive terminal 12, auxiliary terminal 21 becomes the only available "hot" terminal to which a clip from an external charger can be connected. When an external charger is connected with the proper polarity, i.e., positive to positive and negative to negative, storage battery 11 is charged normally. Current from the external charger flows through diode 22 in the forward direction and is blocked from the alternator-rectifier circuit because diodes 16, 17, and 18 will not conduct in the reverse direction. If an external charger or booster battery should be connected with the wrong polarity, i.e., positive to negative and negative to positive, diode 22 would block the flow of current and rectifier diodes 16, 17, and 18 would still be protected.

Figure 2A:
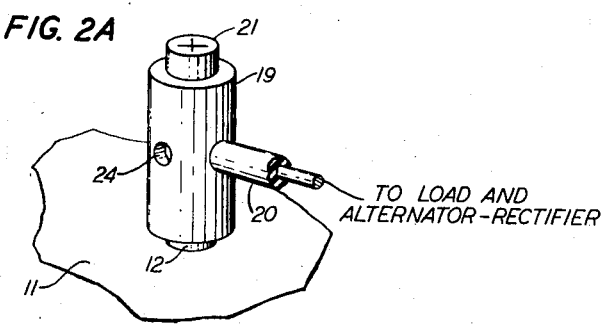
FIG. 2 is a perspective view of a specific battery terminal arrangement which may be used in the embodiment of the invention shown in FIG. 1.
Figure 2B:
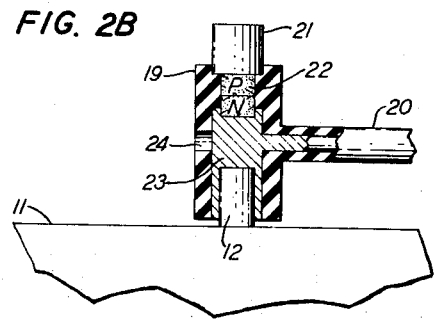

FIGS. 2A and 2B illustrate one form which insulating member 19, auxiliary terminal 21, and diode 22 may take. FIG. 2A is a perspective view and FIG. 2B is a cross-section view. As illustrated, insulating member 19 is cylindrical in form and fits tightly over positive battery terminal 12. Auxiliary terminal 21, which is substantially identical in form to positive battery terminal 12, fits into the top of insulating member 19. Diode 22 is enclosed within insulating member 19, making electrical contact with the bottom of auxiliary terminal 21 and separated from positive battery terminal 12 by a conductive spacer 23. Lead 20 from load 14 and the alternator-rectifier circuit extends through the side of insulating member 19 to make electrical contact with conductive spacer 23. As illustrated, spacer 23 may incorporate conductive sleeves at both top and bottom to ensure better electrical contact with diode 22 and battery terminal 12.

The protective circuitry featured by the invention and illustrated in FIGS. 2A and 2B thus takes the form of a connector for attaching lead 20 to positive terminal 12 of storage battery 11. The connector is simple and inexpensive to manufacture and is therefore suitable for leaving permanently installed on battery 11. Protective diode 22 is an integral part of the unit and auxiliary terminal 21 is readily accessible to clips for connecting it to external charging sources.

An additional feature of the invention in the protective connector shown in FIGS. 2A and 2B is a small aperture 24 in the side of insulating member 19. Aperture 24 provides access to conductive spacer 23 for a suitably designed test probe. Because of the presence of diode 22, auxiliary terminal 21 is unsuitable for use in connection with a meter for measuring the voltage between battery terminals 12 and 13. Aperture 24, however, permits a test probe to reach the potential of positive terminal 12 by way of conductive spacer 23. The usual clip used for connecting an external charger or booster battery will not reach spacer 23, however, and can only be connected to auxiliary terminal 21.

It is to be understood that the above-described arrangement is illustrative of the application of the principles of the invention. Numerous other arrangements may be devised by those skilled in the art without departing from the spirit and scope of the invention.

What is claimed is:
1. In combination with a storage battery having first and second terminals and a charging circuit which comprises an alternator and a rectifier connected between said alternator and said battery terminals, said rectifier being poled in the direction to charge said battery from said alternator, an arrangement for protecting said rectifier from accidental burnout caused by application of an external charging source with incorrect polarity which comprises insulating means to deny external access to said first battery terminal, an auxiliary terminal for said battery, and a unilaterally conducting device connected between said first battery terminal and said auxiliary terminal, said unilaterally conducting device being poled in the direction to charge said battery from an external source connected between said auxiliary terminal and said second battery terminal.

2. A combination in accordance with claim 1 in which said unilaterally conducting device is a semiconductor diode.

3. A combination in accordance with claim 1 in which said first battery terminal is the positive terminal and said second battery terminal is the negative terminal.

4. A combination in accordance with claim 3 in which said unilaterally conducting device is poled for easy current flow from said auxiliary terminal toward said first battery terminal.

5. A combination in accordance with claim 1 in which said insulating means is a hollow cylindrical member covering said first battery terminal at one end, supporting said auxiliary terminal at the other, and enclosing in series between said auxiliary terminal and said first battery terminal said unilaterally conducting device and a conductive spacer, and in which a conductive connection extends through said insulating means from said spacer to said rectifier.

6. A combination in accordance with claim 5 in which said insulating cylindrical member contains an aperture providing access to said conductive spacer only by a test probe.

7. A protectve connector for a storage battery terminal which comprises an auxiliary terminal, an insulating hollow cylinder enclosing said battery terminal at one end and supporting said auxiliary terminal at the other, a unilateral conducting device and a conductive spacer enclosd in tandem between said auxiliary terminal and said battery terminal, said unilaterally conducting device making electrical contact with said auxiliary terminal and said spacer, said spacer making electrical contact with said unilaterally conducting device and said battery terminal, and a conductive conection extending through said insulating cylinder and making electrical contact with said spacer.

8. A protective connector in accordance with claim 7 in which said insulating cylinder contains an aperture providing access to said conductive spacer only by a test probe.

References Cited
UNITED STATES PATENTS

| | | | |
|---|---|---|---|
| 2,557,424 | 6/1951 | Gagnier et al. | 317—43 |
| 2,801,399 | 7/1957 | Dunn et al. | 339—224 |
| 2,853,656 | 9/1958 | Dowds | 317—101 |
| 3,023,353 | 2/1962 | Currey | 317—43 X |
| 3,028,525 | 4/1962 | Morton | 307—146 X |
| 3,051,887 | 8/1962 | Lind | 320—25 |
| 3,085,187 | 4/1963 | Godshalk | 320—25 |
| 3,110,855 | 11/1963 | Chumakov | 317—43 X |
| 3,201,617 | 8/1965 | Pacoroni et al. | 307—146 |
| 3,215,891 | 11/1965 | Fritz et al. | 307—146 X |
| 3,256,466 | 6/1966 | Trolio et al. | 307—146 X |

JOHN F. COUCH, *Primary Examiner.*

S. WEINBERG, *Assistant Examiner.*